(12) United States Patent
Yanagisawa

(10) Patent No.: US 7,082,671 B2
(45) Date of Patent: Aug. 1, 2006

(54) MAGNETIC DISC APPARATUS PRODUCTION METHOD

(75) Inventor: Masahiro Yanagisawa, Tokyo (JP)

(73) Assignee: TDK Corporation (JP)

( * ) Notice: Subject to any disclaimer, the term of this patent is extended or adjusted under 35 U.S.C. 154(b) by 147 days.

(21) Appl. No.: 10/875,902

(22) Filed: Jun. 24, 2004

(65) Prior Publication Data

US 2004/0233583 A1 Nov. 25, 2004

Related U.S. Application Data

(60) Continuation-in-part of application No. 10/212,562, filed on Aug. 5, 2002, now Pat. No. 6,928,722, which is a division of application No. 09/587,132, filed on Jun. 2, 2000, now Pat. No. 6,487,045.

(30) Foreign Application Priority Data

Jun. 3, 1999 (JP) .................... 11-156196

(51) Int. Cl.
*G11B 5/127* (2006.01)
*H04R 31/00* (2006.01)

(52) U.S. Cl. .............. 29/603.12; 29/603.07; 29/603.13; 29/603.15; 29/603.16; 29/603.18; 29/25.35; 29/417; 216/22; 216/39; 216/41; 216/48; 216/65; 360/235.1; 360/235.3; 360/25.7; 360/235.8; 360/236.1; 360/26.6; 451/4; 451/51

(58) Field of Classification Search ........ 29/25.35, 29/417, 603.07, 603.12–603.16, 603.18; 216/22, 39, 41, 48, 65; 360/235.1, 235.3, 360/235.7, 235.8, 236.1, 236.3; 451/4, 51
See application file for complete search history.

(56) References Cited

U.S. PATENT DOCUMENTS 4,669,011 A 5/1987 Lemke .................. 360/75

(Continued)

FOREIGN PATENT DOCUMENTS

EP 0620049 A2 4/1994

(Continued)

OTHER PUBLICATIONS

"Reproduction of slider vibrations during head/disk interactions using PZT sensors"; Wallash, A.; Magnetics, IEEE Transactions on vol. 24, Issue 6; Nov. 1988; pp. 2763-2765.*

(Continued)

*Primary Examiner*—Paul D. Kim
(74) *Attorney, Agent, or Firm*—Hayes Soloway P.C.

(57) ABSTRACT

A recording/reproduction element is mounted on a magnetic head slider via a piezoelectric element so that a displacement of the piezoelectric element performs fine control of the position of the recording/reproduction, thus enabling fine spacing and high track positioning accuracy. This improves linear recording density and track density. A pair of electrodes are formed on both sides of a piezoelectric element to constitute a piezoelectric actuator. One electrode is arranged opposite the rear surface (air flow out end) of a magnetic head slider 11. A recording/reproduction element is arranged on and electrically insulated from the other electrode. The piezoelectric element includes a piezoelectric element displaced in a spacing direction, enabling fine spacing control, a piezoelectric element displaced in the track direction, enabling fine track position control, and a piezoelectric element displaced in a magnetic disc rotation direction, enabling reduction of jitter of a reproduction signal.

4 Claims, 12 Drawing Sheets

U.S. PATENT DOCUMENTS

| | | | | |
|---|---|---|---|---|
| 5,072,240 | A | 12/1991 | Miyazawa et al. | 347/22 |
| 5,177,860 | A | 1/1993 | Yura et al. | 29/603.07 |
| 5,327,310 | A | 7/1994 | Bischoff et al. | 360/237.1 |
| 5,898,541 | A * | 4/1999 | Boutaghou et al. | 29/603.01 |
| 6,057,991 | A * | 5/2000 | Ishiwata et al. | 360/234.9 |
| 6,196,062 | B1 * | 3/2001 | Wright et al. | 73/105 |
| 6,246,552 | B1 | 6/2001 | Soeno et al. | 360/294.4 |
| 6,289,564 | B1 | 9/2001 | Novotny | 29/25.35 |
| 6,327,120 | B1 | 12/2001 | Koganezawa et al. | 360/294.4 |
| 6,534,259 | B1 * | 3/2003 | Wakefield | 435/5 |
| 6,584,660 | B1 | 7/2003 | Shimogawa et al. | 29/25.35 |

FOREIGN PATENT DOCUMENTS

| | | | |
|---|---|---|---|
| JP | 61227210 A | * | 10/1986 |
| JP | 61-251307 | | 11/1986 |
| JP | 1-107385 | | 4/1989 |
| JP | 1-216769 | | 8/1989 |
| JP | 3-105716 | | 5/1991 |
| JP | 3-245315 | | 10/1991 |
| JP | 6-176336 | | 6/1994 |
| JP | 07029120 A | * | 1/1995 |
| JP | 7-73619 | | 3/1995 |
| JP | 7-235157 | | 9/1995 |

OTHER PUBLICATIONS

"Tribology and Mechanics of Magnetic Storage System vol. VII" Bharat Bhushan vol. 7, 1990 pp. 158-164.

"Design and Performance of Piezoelectric Piggyback Actuator for High Density HDD" Soeno et al Japan Society of Mechanical Engineers, The 75th JSME Spring Annual Meeting No. 98-1, 1998 pp. 208-209.

"A study on a piggy back actuator using LIGA process" Nakamura et al Japan Society of Mechanical Engineers, The 75th JSME Spring Annueal Meeting No. 98-1, 1998 pp. 210-211.

"Natural frequencies of sliders and transducers used to detect slider-disk contacts"; Jeong, T.G.; Bogy, D.B.; Magnetics, IEEE Transactions on, vol.: 25, Issue: 5, Sep. 1989; pp. 3725-3727.

* cited by examiner

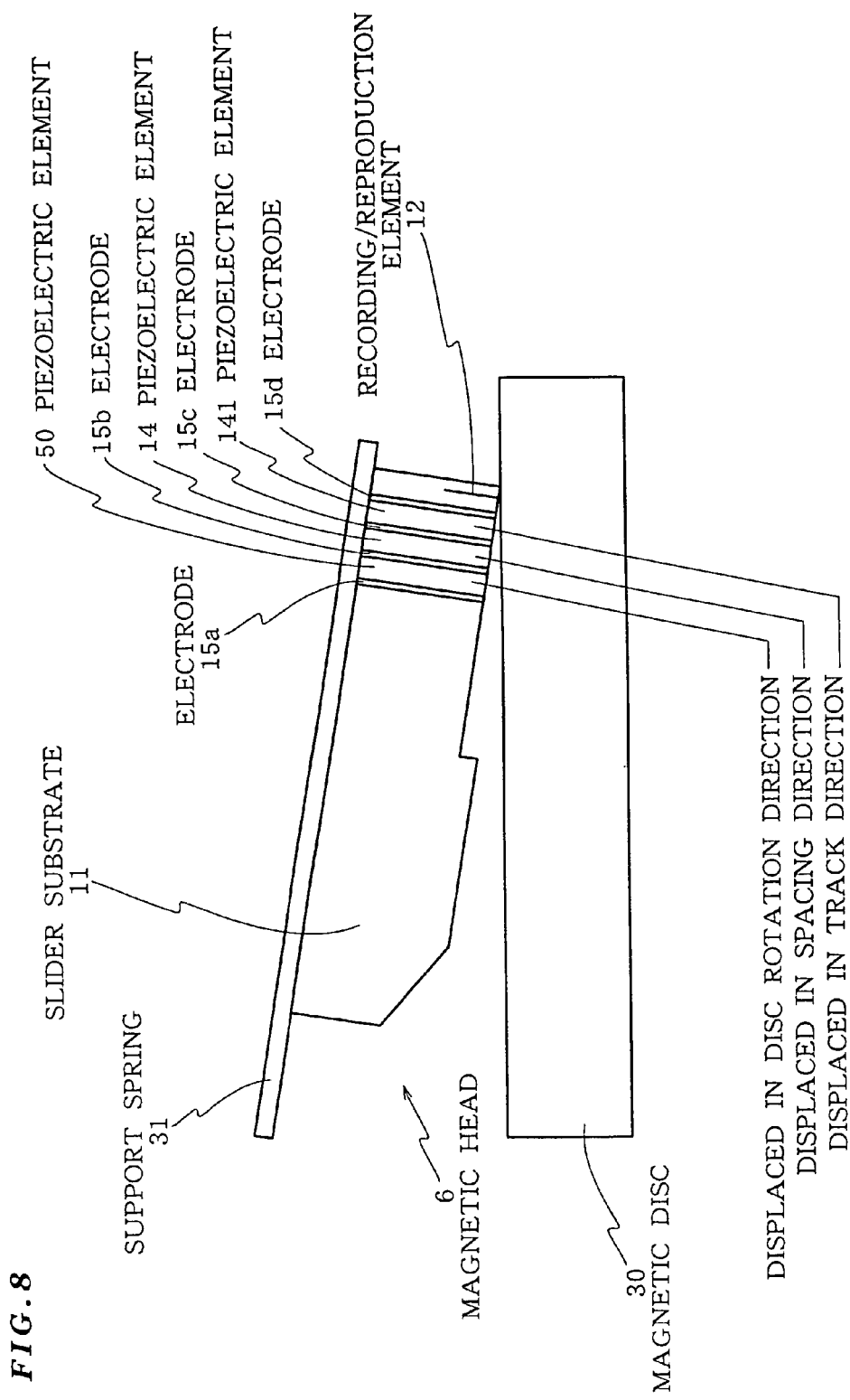

60
WAFER SUBSTRATE

61
WAFER SUBSTRATE HAVING ELECTRODES AND PIEZOELECTRIC ELEMENTS

62
WAFER SUBSTRATE HAVING RECORDING/REPRODUCTION ELEMENTS

63
ROW HAVING FLOAT PLANES

64
SLIDER CHIP

65
MAGNETIC HEAD SLIDER COMPLETED

US 7,082,671 B2

MAGNETIC DISC APPARATUS PRODUCTION METHOD

The present Application is a divisional Application of prior U.S. application Ser. No. 10/212,562, filed Aug. 5, 2002 now U.S. Pat. No. 6,928,722, which in turn is a divisional application of prior U.S. application Ser. No. 09/587,132 filed Jun. 2, 2000, now U.S. Pat. No. 6,487,045.

BACKGROUND OF THE INVENTION

1. Field of the Invention

The present invention relates to a magnetic disc apparatus, a magnetic head, and a production method thereof and in particular, to a magnetic head in which a recording/reproduction element is mounted on a magnetic head slider via a piezoelectric element so that the position of the recording/reproduction element can be adjusted in job mode by displacement of the piezoelectric element, and its production method, and to a magnetic disc apparatus using the magnetic head, and its production method.

2. Description of the Related Art

In a magnetic disc apparatus, recording density can be increased by increasing the recording density (linear recording density) of the magnetic disc rotation direction and the recording density (track density) of the magnetic disc radial direction.

In order to increase linear recording density, it is necessary to reduce the spacing between the magnetic head recording/reproduction element and the magnetic disc. In a conventional magnetic disc apparatus using a float type slider, spacing is reduced by weakening the floating power of the float type slider.

FIG. 10 is a perspective view of a conventional magnetic head (conventional float type magnetic head) using a float type slider. FIG. 10 shows the magnetic head with its float surface (to face a magnetic disc) upward. The reference symbol 20 denotes a slider, 13 denotes a float plane, and 21 denotes a recording/reproduction element.

When floating power of a float type slider is weakened, spacing can follow a greater waviness of the magnetic disc. However, when floating power is weakened, spacing cannot follow a surface configuration (wavelength from micrometers to millimeters, and frequency from several tens of kHz to several hundreds of kHz) of a dimension similar to that of the magnetic head slider. Accordingly, the spacing fluctuates. Moreover, the magnetic head may be brought into contact with the magnetic disc, causing friction.

Moreover, in a conventional magnetic disc apparatus, in order to increase track density, for example, a rotary actuator is used to perform track positioning by driving a head gimbal assembly consisting of a support spring and a magnetic head slider, in a magnetic disc radial direction.

However, in the case of a head gimbal assembly, the magnetic head position is to be controlled via a structure of a low rigidity and low resonance frequency such as a gimbal spring from a position far away from the magnetic head. Accordingly, it is difficult to perform track positioning with high speed and high accuracy.

Moreover, in the case of a recording/reproduction element in contact with a magnetic disc, the magnetic head is moved against friction between the recording/reproduction element and the magnetic disc. Accordingly, it becomes more difficult to perform track positioning with high accuracy.

Thus, in the conventional magnetic disc apparatus, it has been difficult to simultaneously improve linear recording density and track density. For improving recording density, various suggestions have been made. Firstly, conventional techniques for improving linear recording density will be shown.

Tribology and Mechanics of Magnetic Storage System, Volume 7, 1990, pp 158–164 [1] discloses a technique for reducing spacing by burying a piezoelectric element expanding and contracting in parallel to the drive electric field, into the back of a float type magnetic head slider and applying an electric field to this piezoelectric element.

FIG. 11 is a perspective view of a conventional magnetic head (magnetic head slider) in which a piezoelectric element is buried into the back of a float type magnetic head slider. FIG. 12 explains the operation of a conventional magnetic head (magnetic head slider) in which a piezoelectric element is buried into the back of a float type magnetic head slider. In FIG. 11, the reference symbol 20 denotes a slider, 21 denotes a recording/reproduction element, 22 denotes a layered piezoelectric element, and 23 denotes electrodes. In FIG. 12, the reference symbol 30 denotes a magnetic disc. The reference symbol 24a indicates a displacement direction of the piezoelectric element, 24b indicates a displacement direction of the recording/reproduction element caused by the displacement of the piezoelectric element, and 17 indicates the spacing direction.

Japanese Patent Publication 1-107385 [2] discloses a magnetic recording apparatus in which a displacement sensor measures the distance between a magnetic recording medium and a magnetic head and an actuator is driven so as to maintain the distance constant, so that the interval between the medium and the head is reduced. This magnetic recording apparatus is constituted as follows. The interval between the magnetic recording medium and the magnetic head is measured by an intensity change of the return light emitted from a light reflection intensity type displacement meter through an optical fiber and reflected from the medium surface. The magnetic head uses a piezoelectric actuator driven by a servo circuit and an amplifier according to a displacement fluctuation signal from the light reflection intensity type displacement meter, and maintains a constant distance from the surface of the magnetic recording medium. Thus, by measuring the distance between the magnetic recording medium and the magnetic head using a displacement sensor so that the distance is maintained constant by driving the actuator attached to the magnetic head, it is possible to maintain a very small interval between the magnetic recording medium and the magnetic head as a non-contact state or contact state with a very small weight.

Japanese Patent Publication 7-235157 [3] discloses a magnetic disc apparatus in which the distance between the magnetic head and the magnetic disc is measured from time to time and maintained constant while performing a signal recording/reproduction so that a floating margin is reduced and recording is enabled with a smaller floating amount. This magnetic disc apparatus is constituted as follows. When the magnetic disc apparatus is started and the magnetic disc is rotated at a comparatively low speed, the magnetic head floats over the magnetic disc surface and reads a signal recorded, with the reproduction element mounted, while traveling in a floating state. From strength of this signal, a detailed floating amount fluctuation is read and a control signal is transmitted to the piezoelectric element. The piezoelectric element, upon reception of the control signal, expands and contracts in the longitudinal direction so as to raise and lower the recording element and the reproduction element according to the unevenness of the surface so as to maintain a predetermined distance from the surface and maintain a float amount constant. Accordingly, it is possible to obtain a magnetic disc apparatus having a smaller float amount and a higher recording density. Moreover, it is possible to prevent contact between the magnetic head and the magnetic disc.

Next, conventional techniques for improving mainly the track density will be shown.

Although the document name [4] is unknown, there has been suggested a technique to drive a support spring supporting a magnetic head slider by an electromagnetic actuator in order to increase track density.

The Japan Society of Mechanical Engineers, proceedings (4), No. 98-1, 1998, pp 208–209 [5] describes a technique to drive an entire magnetic head slider by a piezoelectric element beam.

The Japan Society of Mechanical Engineers, proceedings (4), No. 98-1, 1998, pp 210–211 [6] describes a technique to drive a recording/reproduction element by an electrostatic actuator provided at the back end of a slider.

Japanese Patent Publication 3-245315[7] discloses a head slider on which a drive member is provided for changing the position of a transducer in the positioning direction (track width direction), so as to perform positioning with high speed and high accuracy. This head slider is constituted as follows. The drive member is a piezoelectric element which changes its size in a direction perpendicular to the positioning direction. Furthermore, a conversion mechanism is provided on the slider for converting the piezoelectric element size change into a displacement amount of the transducer in the positioning direction. The conversion mechanism converts a deformation amount of the drive member in a direction perpendicular to the positioning direction of the transducer (track width direction) into a displacement amount in the positioning direction of the transducer. Thus, use of the drive member increases the degree of freedom.

Japanese Patent Publication 6-176336 [8] discloses a magnetic recording/reproduction apparatus in which data parallel transfer is enabled, high speed data transfer is realized, and a servo can be operated for each of the recording/reproduction elements, increasing positioning accuracy and track density. This magnetic recording/reproduction apparatus is constituted as follows. Rail members constituting the slider are connected to a piezoelectric element and the rail interval is made variable. By using a plurality of these configurations, a multi-element slider is realized. In this apparatus, for each of the recording/reproduction elements, there is provided a recording/reproduction circuit, so that recording/reproduction is performed simultaneously. By controlling the piezoelectric element for the rail interval, it is possible to accommodate variable track densities.

Japanese Patent Publication 7-73619 [9] discloses a magnetic head and a magnetic recording/reproduction apparatus which performs tracking control of the magnetic head. The magnetic head is intended for enlarging a data region in a recording medium and increasing accuracy of off track control. This magnetic head and the magnetic recording/reproduction apparatus using this magnetic head are constituted as follows. A magnetic head is constituted by providing a piezoelectric element at a cut-off portion of a slider for moving a movable block having a thin film head in the magnetic disc radial direction by electrostrictive displacement. The piezoelectric element is driven according to read data error detection so as to control the off track. Thus, servo information can be removed from a data region of the recording medium.

FIG. 11 shows a magnetic head in which a piezoelectric element expanding and contracting in parallel to the drive electric field is buried in the back of a floating type magnetic head slider. By applying an electric field to this piezoelectric element, spacing is reduced. With this magnetic head, as shown in FIG. 12, the recording/reproduction element may be inclined and the recording/reproduction element may not be at the lower most point of the magnetic head slider. In other words, there may arise a clearance between the recording/reproduction element and a magnetic disc. Moreover, in this technique, the piezoelectric element expands and contracts too much in the magnetic disc rotation direction and time fluctuation (jitter) of a recording/reproduction signal may become remarkable.

The technique described in Document [2], i.e., the technique to drive a magnetic head into the spacing direction by a piezoelectric actuator has a problem that it is difficult to follow the magnetic disc swell (amplitude of 1 to 10 micrometers, wavelength of several tens to hundreds of mm, and frequency of several tens to hundreds of Hz) only by the piezoelectric actuator.

The magnetic head used in the magnetic disc apparatus described in Document [3] has a structure that a recording/reproduction element is attached downward via a piezoelectric element at the rear portion of the magnetic head slider. Accordingly, a piezoelectric element and a recording/reproduction element are mounted on each magnetic head slider, which is not appropriate for mass production of magnetic heads.

The technique to drive the support spring supporting a magnetic head slider, by an electromagnetic actuator, and the technique to drive the entire magnetic head slider by a piezoelectric element beam have a problem that resonance frequency is too low. Moreover, since the drive source is apart from the recording/reproduction element, there is a problem that there arises a delay of a reproduction signal used for position detection information.

The technique to drive a recording/reproduction element by an electrostatic actuator provided at the rear end of the slider has a problem that a flexible spring structure is used and resonance frequency is too low, and because the drive force is small, it is difficult to drive the recording/reproduction element at a high speed.

The head slider described in Document [7] can perform positioning in the track direction but cannot control the spacing direction.

The magnetic recording/reproduction apparatus described in Document [8] can perform a multi-element simultaneous tracking but cannot perform control in the spacing direction.

The magnetic head described in Document [9] has a structure that a thin film head is attached via a piezoelectric element at a cut-off portion formed in the slider. Accordingly, it is necessary to mount a piezoelectric element and a recording/reproduction element for each slider, which is not appropriate for mass production of magnetic heads.

Moreover, the minimum spacing is the state that a recording/reproduction element of the magnetic head is in contact with the surface of a magnetic disc. However, with the conventional techniques, it is difficult to increase the track positioning accuracy in such a minimum spacing state.

SUMMARY OF THE INVENTION

It is therefore an object of the present invention to provide a magnetic head capable of following swell of the roughness of a magnetic disc with small spacing so as to increase linear recording density. Another object of the present invention is to provide a magnetic head capable of positioning with high accuracy in the magnetic disc radial direction, thereby increasing track density. Furthermore, it is an object of the present invention to provide a magnetic head having small spacing and capable of positioning with high accuracy in the magnetic disc radial direction, thereby simultaneously increasing linear recording density and track density. Moreover, the present invention provides a magnetic head production method appropriate for mass production of magnetic heads and provides a magnetic disc apparatus using magnetic heads.

The magnetic disc apparatus in one embodiment of the invention comprises a magnetic head slider floating on air with respect to a predetermined magnetic disc, the magnetic head slider including: a recording/reproduction element in the vicinity of an air flow out end of the magnetic head slider; and a piezoelectric element for displacing the recording/reproduction element in the direction toward the magnetic disc. The piezoelectric element is displaced in a direction perpendicular to the voltage application direction utilizing, for example, a slide vibration.

In this magnetic disc apparatus, the recording/reproduction element is mounted on the magnetic head slider via a piezoelectric element. Accordingly, by controlling the voltage applied to the piezoelectric element so as to control the displacement amount of the piezoelectric element, it is possible to displace the recording/reproduction element. Thus, by using a piezoelectric element, it is possible to control the position of the recording/reproduction element with high rigidity, high speed, and high accuracy.

By using a piezoelectric element displaced in the spacing direction by a voltage application, it is possible to control spacing between the recording/reproduction element and the magnetic disc. By controlling the displacement amount of the piezoelectric element so that the recording/reproduction element is in slight contact with the surface of the magnetic disc, it is possible to maintain minimum spacing. Since the piezoelectric element is used, it is possible to obtain spacing control with high rigidity, high speed, and high accuracy.

By using a piezoelectric element displaced in a radial direction (track direction) of a magnetic disc, it is possible to control the position of the recording/reproduction element in the track direction. Since a piezoelectric element is used, it is possible to perform track positioning control with high rigidity, high speed, and high accuracy.

By using a layered configuration of a piezoelectric element displaced in a spacing direction and a piezoelectric element deflecting in a track direction, it is possible to displace the recording/reproduction element in two directions. This permits control of the spacing between the recording/reproduction element and the magnetic disc, and the track positioning with high rigidity, high speed, and high accuracy. That is, it is possible to simultaneously perform spacing control and track positioning control without interfering with each other.

In another embodiment of the invention, the magnetic disc apparatus uses a magnetic disc slider including a recording/reproduction element arranged in the vicinity of an air flow out end of a magnetic head slider floating on air, and formed on a piezoelectric element deflecting in parallel to the voltage application direction and on a piezoelectric element deflecting in a direction perpendicular to the voltage application direction.

In this latter embodiment, the recording/reproduction element is mounted via two piezoelectric elements displaced in different directions and accordingly, it is possible to control the position of the recording/reproduction element in two directions. Since a piezoelectric element is used, it is possible to control the position of the recording/reproduction element with high rigidity, high speed, and high accuracy. It is possible to control the position in two directions without interfering with each other. It is possible to perform position control simultaneously in two directions.

By providing a piezoelectric element displaced in the rotation direction of a magnetic disc and a piezoelectric element displaced in the spacing direction, it is possible to control the position of the recording/reproduction element in the disc rotation direction and the spacing direction. The control of the position of the recording/reproduction element in the disc rotation direction can reduce recording/reproduction signal jitter. The control of the position of the recording/reproduction element in the spacing direction can maintain minimum spacing. Since piezoelectric elements are used, it is possible to control the position of the recording/reproduction element in the disc rotation direction and to control the spacing with high rigidity, high speed, and high accuracy. It is possible to control the position of the recording/reproduction element in the disc rotation direction and spacing simultaneously and without interfering with each other.

By providing a piezoelectric element displaced in the rotation direction of a magnetic disc and a piezoelectric element displaced in the track direction, it is possible to control the position of the recording/reproduction element in the disc rotation direction and in the track direction. By controlling the position of the recording/reproduction element in the disc rotation direction, it is possible to reduce recording/reproduction signal jitter. By controlling the position of the recording/reproduction element in the track direction, it is possible to perform track positioning. Since the piezoelectric elements are used, it is possible to perform the position control of the recording/reproduction element in the disc rotation direction and the track positioning control with high rigidity, high speed, and high accuracy. The position control of the recording/reproduction element in the disc rotation direction and the track positioning control can be performed simultaneously and without interfering with each other.

In another embodiment of the invention, the magnetic head includes a piezoelectric actuator at an air flow out end of a floating type magnetic head slider, the piezoelectric actuator having at both its sides a pair of electrodes, one of which is arranged opposite the air flow out end of the magnetic head slider and the other of which has a recording/reproduction element electrically insulated from the electrode.

With this configuration, a piezoelectric actuator is formed on a slider substrate, and a plurality of recording/reproduction elements is formed at a predetermined interval. After this, the slider substrate is divided into rows and chips so as to produce a plurality of magnetic heads.

By providing the piezoelectric actuator displaced in the spacing direction, it is possible to control the position of the recording/reproduction element in the spacing direction.

By providing the piezoelectric actuator displaced in the track direction, it is possible to control the track positioning of the recording/reproduction element.

By providing the piezoelectric actuator displaced in a rotation direction of a magnetic disc, it is possible to control the position of the recording/reproduction element in the rotation direction of the magnetic disc.

In yet another embodiment of the invention, the magnetic head includes a plurality of layered piezoelectric actuators having different displacement directions and arranged at an air flow out end of a floating type magnetic head slider, wherein a first outer electrode of the layered plurality of actuators is arranged opposite the air flow out end of the magnetic head slider and a second outer electrode of the layered plurality of piezoelectric actuators has a recording/reproduction element electrically insulated from the second outer electrode.

With this configuration, it is possible to form a plurality of layered piezoelectric actuators on a slider substrate and to form a plurality of recording/reproduction elements at a predetermined interval, after which the slider substrate is cut into rows and chips so as to produce a plurality of magnetic heads.

By providing a piezoelectric actuator displaced in the spacing direction and a piezoelectric actuator displaced in the track direction, it is possible to perform position control of the recording/reproduction element in the spacing direction and the track positioning control.

By providing piezoelectric actuator displaced in the rotation direction of a magnetic disc and a piezoelectric actuator displaced in the spacing direction, it is possible to perform position control of the recording/reproduction element in the magnetic disc rotation direction and in the spacing direction.

By providing a piezoelectric actuator displaced in the rotation direction of a magnetic disc, a piezoelectric actuator displaced in the spacing direction, and a piezoelectric actuator displaced in the track direction, it is possible to perform position control of the recording/reproduction element in the magnetic disc rotation direction and spacing direction as well as the track positioning.

The magnetic head production method in accordance with one aspect of the present invention comprises steps of: bonding a piezoelectric element thin plate having on both its sides an electrode film, onto a substrate using one of the electrode films as a bonding surface, forming an insulation thin film on the other electrode film of the piezoelectric thin plate, forming a plurality of recording/reproduction elements at a predetermined interval on the insulation thin film, forming an insulation thin film on the recording/reproduction elements, cutting the substrate which is manufactured in the previous steps into rows, each having recording/reproduction elements arranged in a row, polishing that surface of the row substrate having the recording/reproduction elements, forming a plurality of float planes by etching the side surfaces of the row substrate, forming a protection film on the side surfaces of the row substrate, and cutting the row substrate into slider chips.

With this production procedure, it is possible to economically produce a plurality of magnetic heads.

The magnetic disc apparatus production method in accordance with another aspect of the present invention comprises steps of: bonding a magnetic head (slider chip) produced by the aforementioned method, to a gimbal spring, and wiring the recording/reproduction element and the electrodes of the piezoelectric element in the slider chip, to the gimbal spring.

By using the magnetic head produced according to the aforementioned magnetic head production method, it is possible to economically provide a magnetic disc apparatus having high recording density and high mechanical reliability.

BRIEF DESCRIPTION OF THE DRAWINGS

FIG. 8 shows a positional relationship between the magnetic head (magnetic head slider) of FIG. 7 and a magnetic disc.

DESCRIPTION OF THE PREFERRED EMBODIMENTS

Hereinafter, explanation will be given on embodiments of the present invention with reference to the attached drawings.

Figure 1:
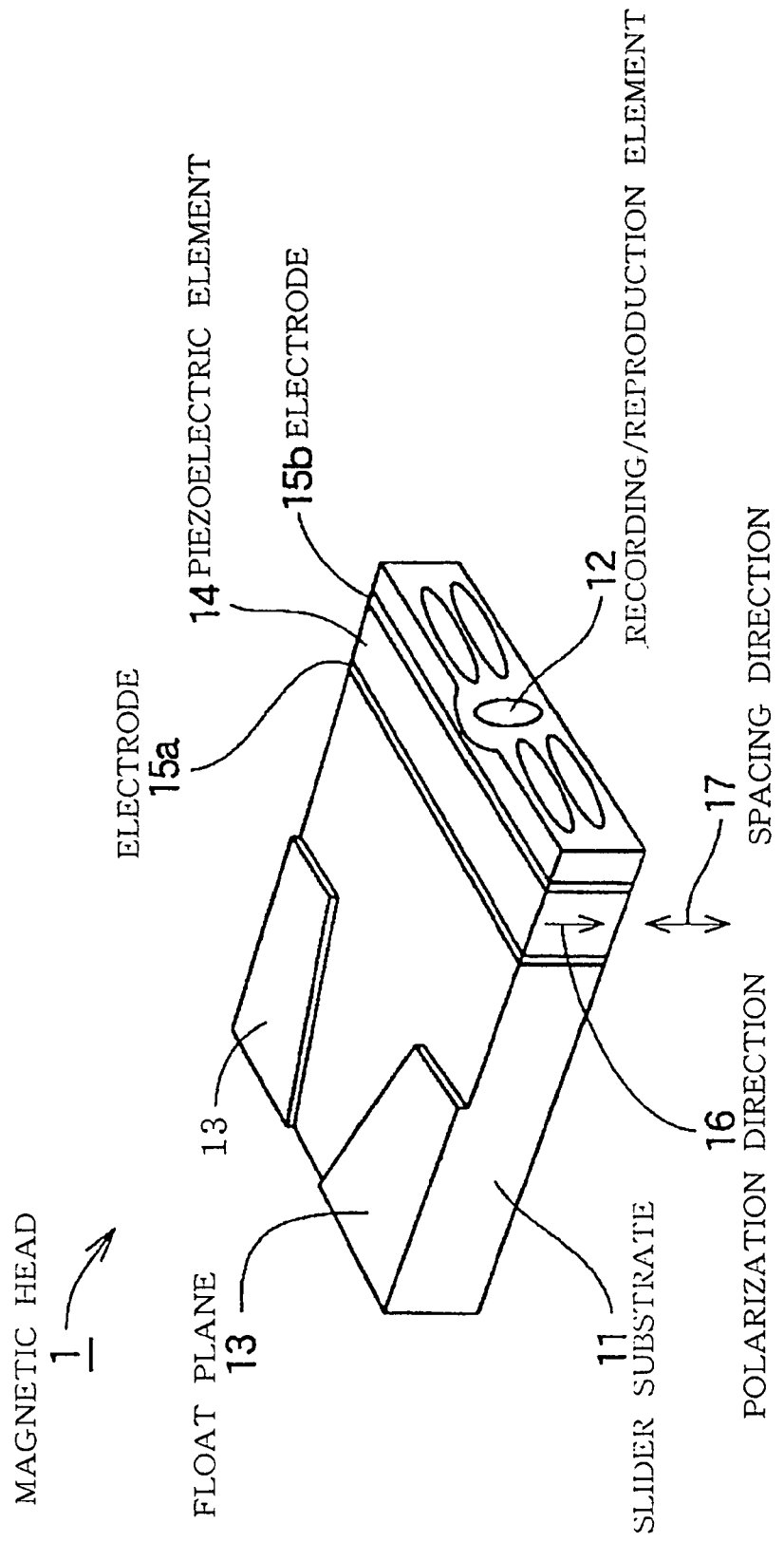
FIG. 1 is a perspective view of a magnetic head (magnetic head slider) according to a first embodiment of the present invention.

FIG. 1 is a perspective view of a magnetic head (magnetic head slider) according to a first embodiment of the present invention. FIG. 1 shows a magnetic head floating plane (facing a magnetic disc) upward. The magnetic head (magnetic headslider) shown in FIG. 1 includes a slider substrate 11, a piezoelectric element 14 sandwiched by electrodes 15a and 15b, and a recording/reproduction element 12. A floating plane 13 is formed on the surface of the slider substrate 11.

The piezoelectric element 14 is attached to the rear end surface (air flow out end) of the slider substrate 11 via one of the electrodes 15a. On the side of the other electrode 15b of the piezoelectric element 14, the recording/reproduction element 12 is arranged.

The piezoelectric element 14 is displaced when an electric field is applied between the electrodes 15a and 15b. In the case when the polarization direction 16 of the piezoelectric element 14 is perpendicular to the electric field, the piezoelectric element 14 is displaced in a direction perpendicular to the electric field. The magnetic head 1 in FIG. 1 uses the piezoelectric element 14 whose polarization direction 16 is a spacing direction between the magnetic head slider and the magnetic disc. Accordingly, when an electric field is applied to the piezoelectric element 14, the recording/reproduction element 12 is displaced in the spacing direction 17.

Figure 2:
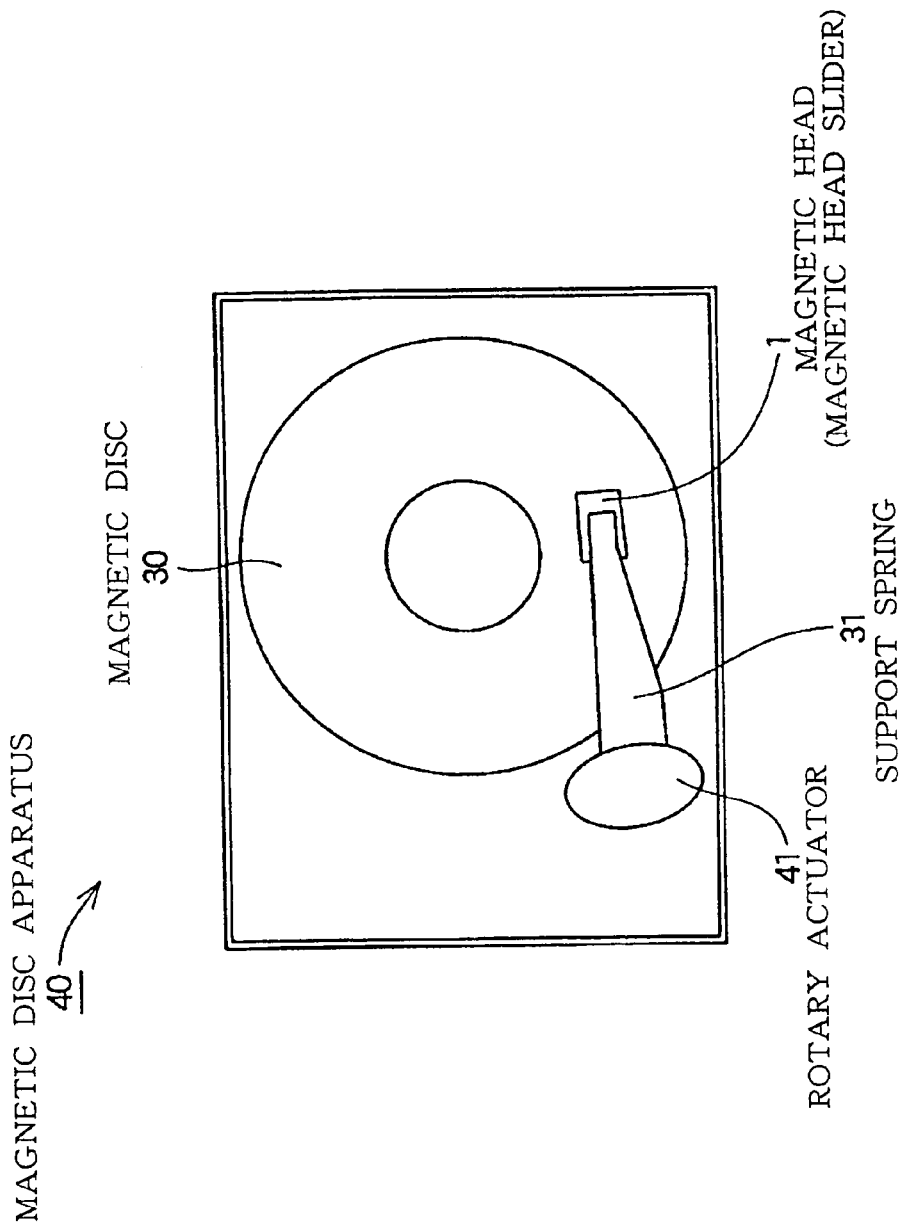
FIG. 2 schematically shows a magnetic disc apparatus according to the present invention.

FIG. 2 schematically shows a configuration of a magnetic disc apparatus according to the present invention. The magnetic disc apparatus 40 includes the magnetic head (magnetic head slider) 1, a support spring 31, a rotary actuator 41, a magnetic disc 30, a spindle motor (not depicted), and a control apparatus (not depicted).

The magnetic disc apparatus 40 according to the present invention controls the electric field to be applied to the piezoelectric element 14, so as to minimize spacing. A control signal may use a reproduction signal or a high frequency electric field generated in the piezoelectric element by an elastic acoustic wave (AE wave) generated by the contact between the magnetic head 1 and the magnetic disc. Moreover, it is possible to use a displacement signal utilizing a light reflection intensity change, light doppler effect, light interference, near field light, or eddy current.

In order to minimize spacing, it is preferable that the magnetic head (magnetic head slider) is brought into slight contact with the magnetic disc 30. Excessive contact causes wearing. Non-contact results in lowering of the recording density.

Actually, the spacing of the magnetic head slider fluctuates. If an average position of the fluctuation is made as a relative position zero to be matched with a contact start point, then a positive fluctuation d becomes a spacing S and a negative fluctuation d is converted into a contact force F by a following equation $$F=|G \cdot d|$$

where G represents rigidity of the slider.

Since contact force is proportional wear, if the fluctuation d is made small, spacing also can be made small. The rigidity of the magnetic head slider remains the same if the support spring, slider size, and floating plane configuration are the same.

Figure 10:
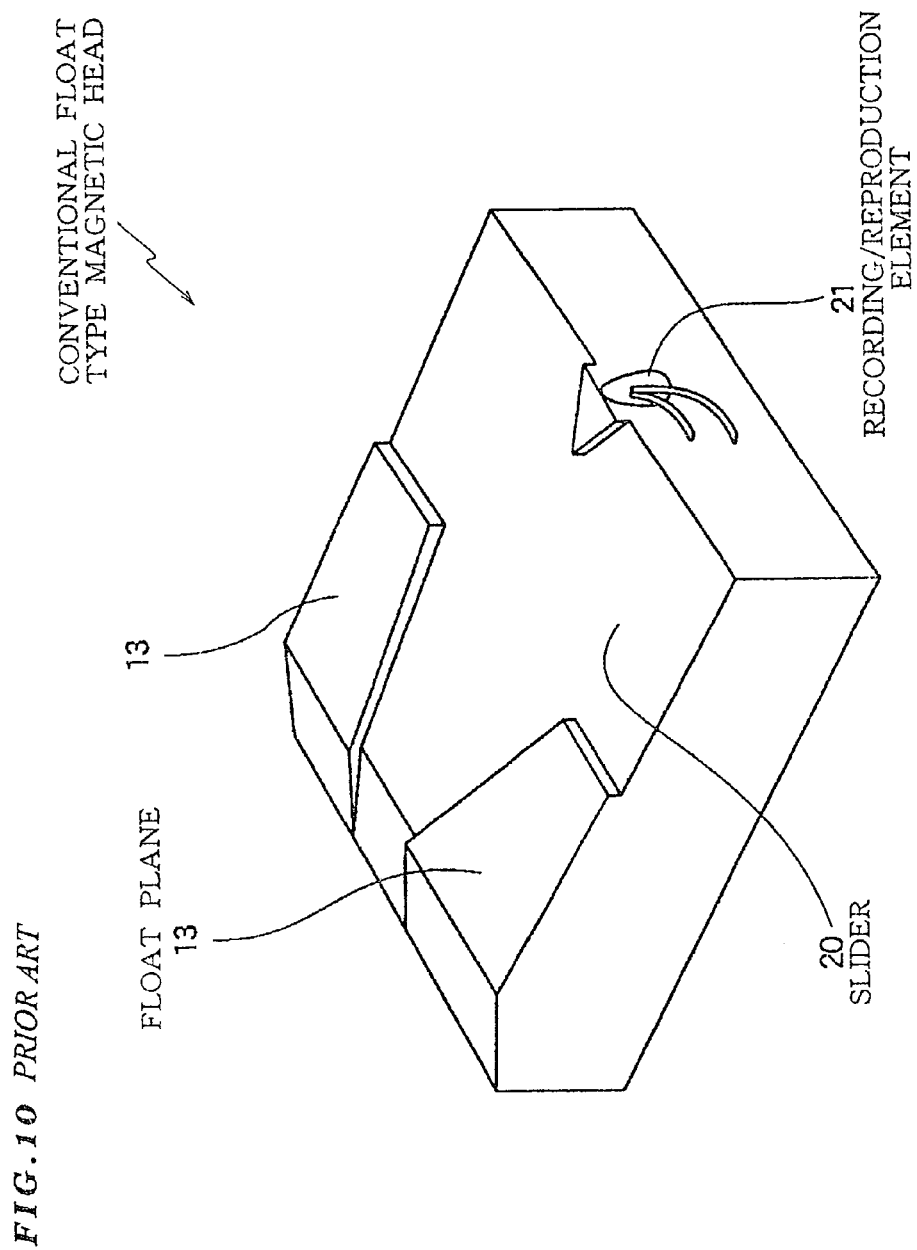
FIG. 10 is a perspective view of a conventional magnetic head (conventional floating type magnetic head) using a floating type slider.

In a conventional magnetic head (magnetic head slider) as shown in FIG. 10, if spacing becomes equal to or below 30 nm, it is difficult to make the fluctuation amount equal to or below the spacing. In a magnetic disc apparatus using a conventional magnetic head (magnetic head slider) as shown in FIG. 10, the fluctuation amount of a reproduction signal after 100 hours of reproduction operation reached 50% and a wear scar was observed.

In contrast to this, in a magnetic disc apparatus according to the present invention using a magnetic head (magnetic head slider) 1 according to the present invention, the fluctuation amount of a reproduction signal after 100 hours of reproduction operation is equal to or below 5%. In the magnetic disc apparatus according to the present invention, it was possible to obtain a small spacing value of 0 to 1 nm with little fluctuation.

Figure 11:
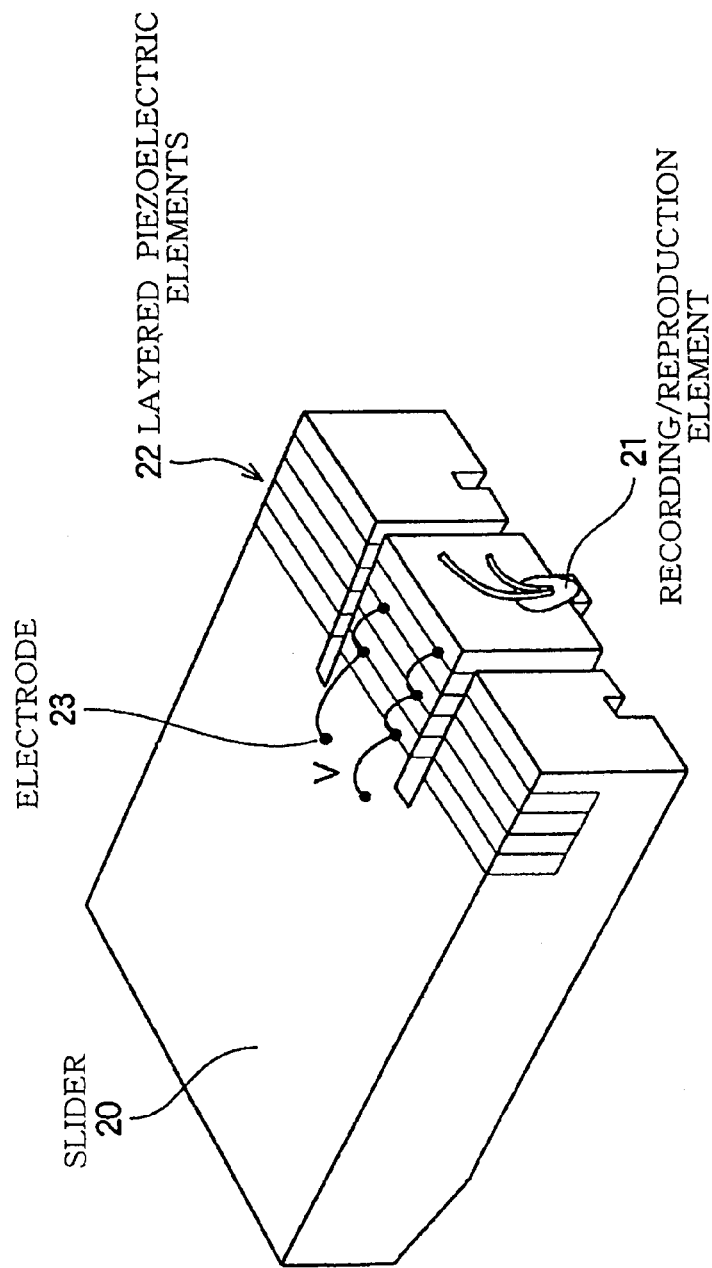
FIG. 11 is a perspective view of a conventional magnetic head (magnetic head slider) having a piezoelectric element buried in the back of the floating type magnetic head slider.
Figure 12:
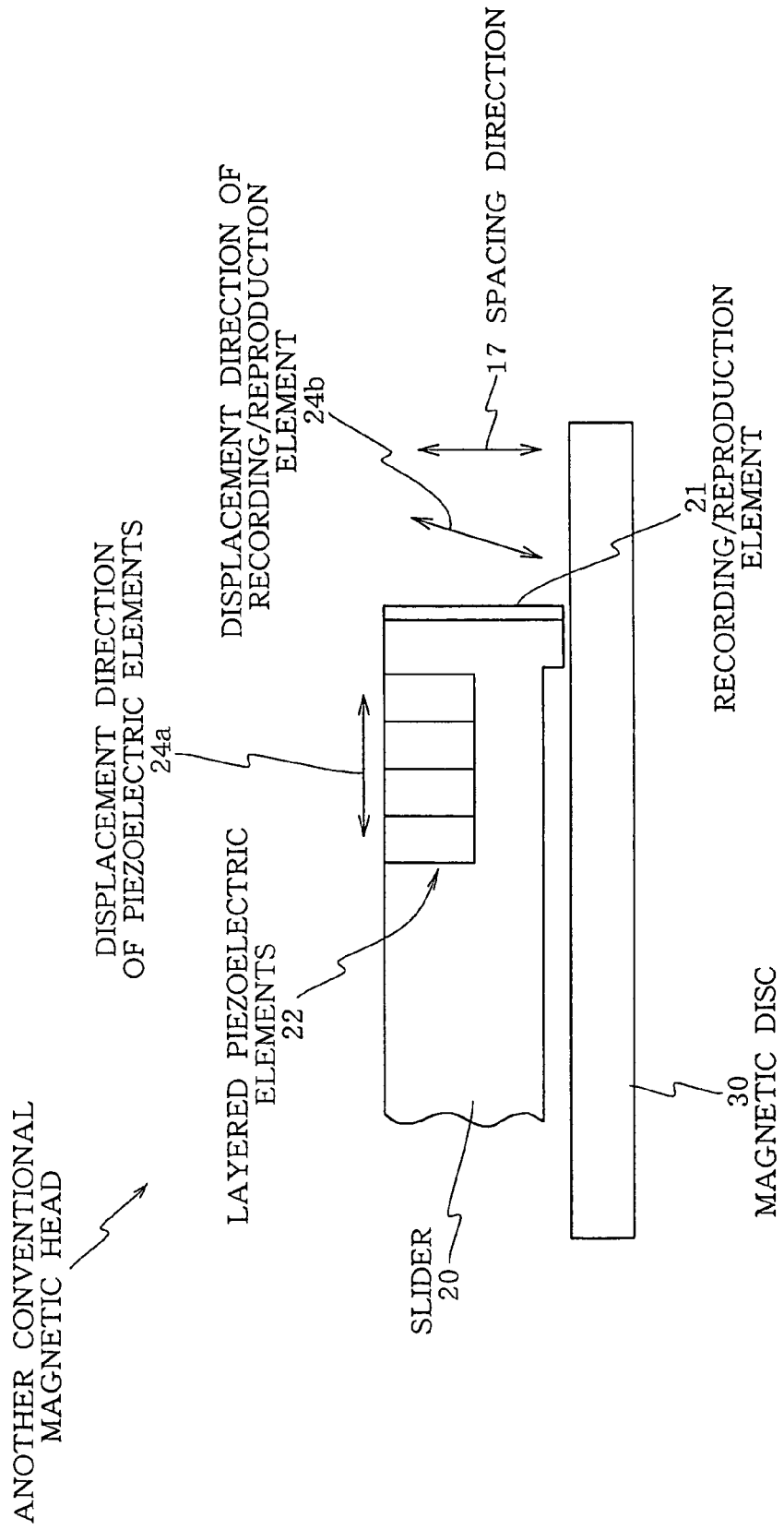
FIG. 12 explains operation of a conventional magnetic head (magnetic head slider) having a piezoelectric element buried in the back of the floating type magnetic head slider.

In a conventional magnetic head (magnetic head slider) as shown in FIG. 11, the layered piezoelectric element 22 buried in the top of the slider 20 expands and contracts in parallel to the electric field applied between the electrodes 23, so as to deflect the recording/reproduction element 21, so that the recording/reproduction element 21 approaches the magnetic disc 30. Accordingly, as shown in FIG. 12, the recording/reproduction element 21 is inclined with respect to the magnetic disc 30 and small spacing cannot be obtained. Moreover, since the recording/reproduction element 21 is displaced in the rotation direction of the magnetic disc 30, the reproduction output time fluctuation (jitter) becomes greater.

In contrast to this, in the magnetic head and the magnetic disc apparatus according to the present invention, as shown in FIG. 1, the recording/reproduction element 12 is mounted via the piezoelectric element 14 displacing in the spacing direction, it is possible to displace the recording/reproduction element 12 in the spacing direction 17. Accordingly, no time fluctuation (jitter) is caused by the spacing control.

Figure 3:
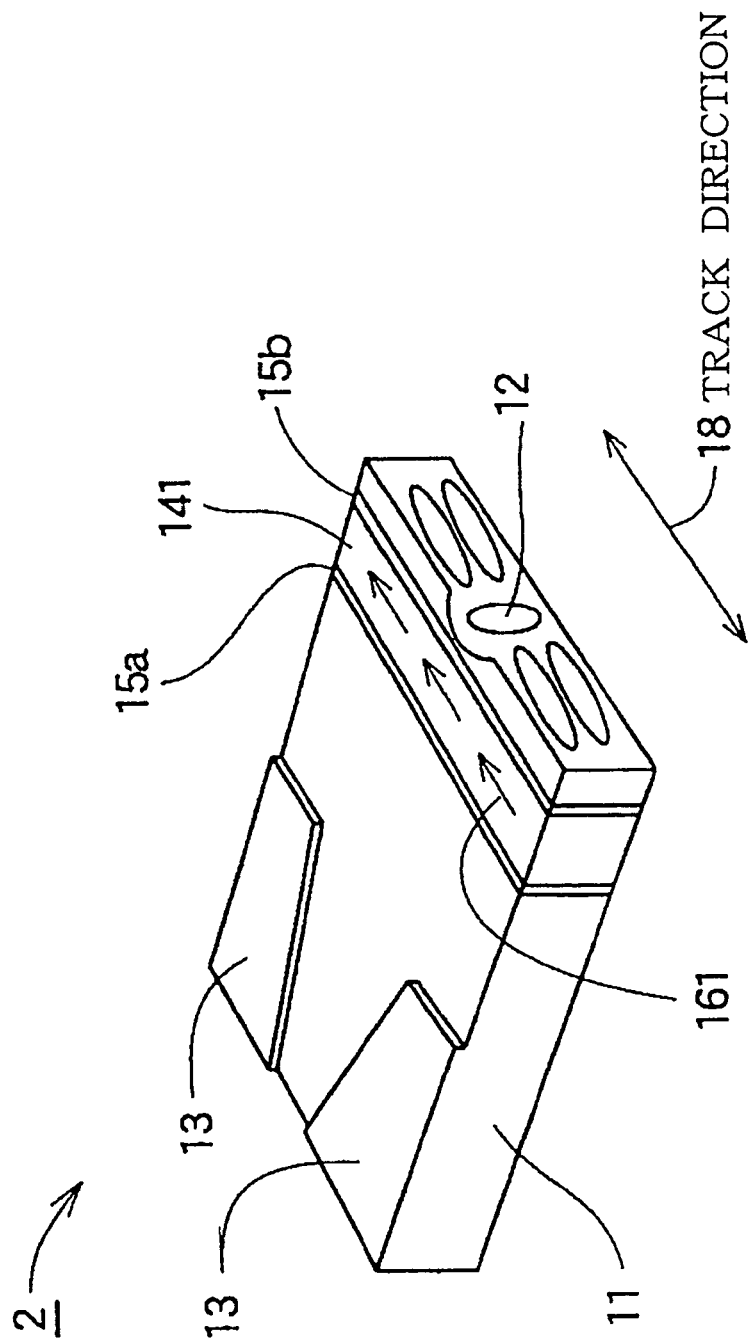
FIG. 3 is a perspective view of a magnetic head (magnetic head slider) according to a second embodiment of the present invention.

FIG. 3 is a perspective view of a magnetic head (magnetic head slider) according to a second embodiment of the present invention. In the magnetic head (magnetic head slider) 2 shown in FIG. 3, a floating plane 13 is formed on the surface of the slider substrate 11. Moreover, in this magnetic head (magnetic head slider) 2, a piezoelectric element 141 sandwiched by electrodes 15a and 15b is attached to the rear surface of the slider substrate 11 and a recording/reproduction element 12 is arranged via the piezoelectric element 141. The piezoelectric element 141 has a polarization direction 161 perpendicular to the direction of the electric field.

In the magnetic head (magnetic head slider) 2 shown in FIG. 3, the polarization direction 161 of the piezoelectric element 141 is in the radial direction (track direction) of a magnetic disc. Accordingly, by applying an electric field between the electrodes 15a and 15b, it is possible to displace the recording/reproduction element 12 in the track direction. The electric field applied to the piezoelectric element 141 is controlled and positioned so that the recording/reproduction element 12 is matched with the recording track. A reproduction signal is used as the control signal.

The magnetic head (magnetic head slider) 2 of FIG. 3 was combined with the support spring 31, the rotary actuator 41, and the magnetic disc 30, so as to obtain a magnetic disc apparatus 40, and recording/reproduction characteristics were measured.

When track positioning is performed by the rotary actuator alone, the track positioning is limited to about 2 micrometers. However, by using the magnetic head (magnetic head slider) 2 of FIG. 3 and using the positioning control in the track direction by the piezoelectric element 141, it is possible to obtain track positioning in the order of 10 nm.

In the technique described in Document [6] (a recording/reproduction element is driven by an electrostatic actuator for track positioning), the drive force of the electrostatic actuator is too small and a beam structure of small rigidity should be used. Accordingly, resonance frequency of only 15 kHz can be obtained.

In the technique described in Document [5] (an entire magnetic head slider is driven by a piezoelectric element beam), the beam structure rigidity is too low and the resonance frequency can be increased only to about 20 kHz.

In contrast to this, the magnetic head (magnetic head slider) 2 of FIG. 3 enables one to increase rigidity and obtain high resonance frequency of 500 kHz or above.

Figure 4:
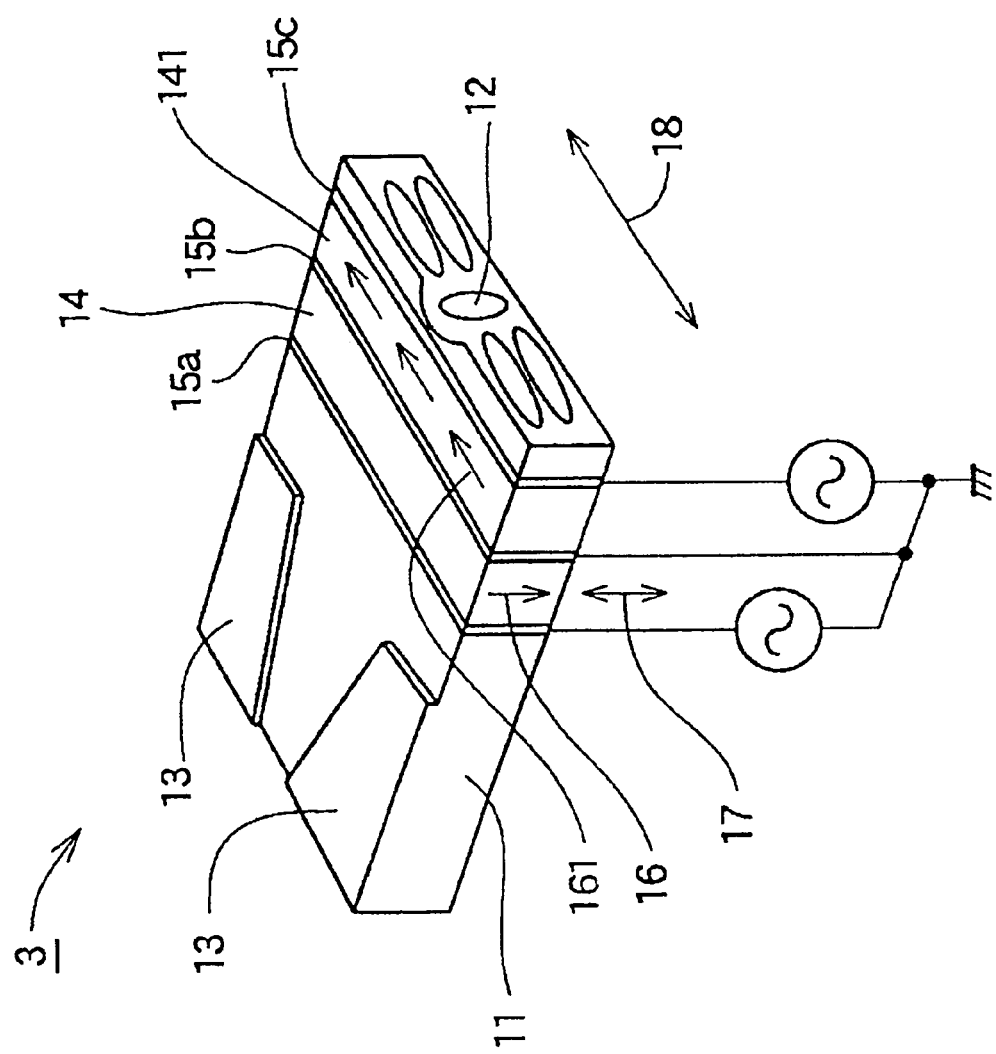
FIG. 4 is a perspective view of a magnetic head (magnetic head slider) according to a third embodiment of the present invention.

FIG. 4 is a perspective view of a magnetic head (magnetic head slider) according to a third embodiment of the present invention. In the magnetic head (magnetic head slider) 3 shown in FIG. 4, a floating plane 13 is formed on the surface of the slider substrate 11. Moreover, in this magnetic head (magnetic head slider) 3, on the rear surface of the slider substrate 11, a piezoelectric element 14 sandwiched between an electrode 15a and a common electrode 15b and a piezoelectric element 141 sandwiched by the common electrode 15b and an electrode 15c are layered, and a recording/reproduction element 12 is arranged on the electrode 15c.

The piezoelectric element 14 has a polarization direction 16 in the spacing direction 17, and the piezoelectric element 141 has a polarization direction 161 in the track direction 18. Thus, the polarization directions 16 and 161 of the two piezoelectric elements 14 and 141 are in the spacing direction 17 and the track direction 18 which are perpendicular to each other. Accordingly, by applying an electric field to the piezoelectric elements 14 and 141, it is possible to displace the recording/reproduction element 12 both in the spacing direction 17 and the track direction 18.

The electric field applied to the one piezoelectric element 14 is controlled so as to minimize spacing. The electric field applied to the other piezoelectric element 141 is controlled so that the recording/reproduction element 12 is matched with the recording track. Since the drive system has high rigidity, there is no interference between spacing direction displacement and track direction displacement. Each of them has a resonance frequency of 500 kHz or above. This resonance frequency is the same as that of the magnetic head 1 shown in FIG. 1 and the magnetic head 2 shown in FIG. 3 which has one set of piezoelectric elements.

The magnetic head (magnetic head slider) 3 shown in FIG. 4 was used to constitute the magnetic disc apparatus 40 shown in FIG. 2 and recording/reproduction characteristics were measured. As a result, it was confirmed that it is possible to obtain small fluctuation of the recording/reproduction signal in the same way as the magnetic head 1 of FIG. 1 and high track positioning accuracy as in the magnetic head 2 of FIG. 3.

Figure 5:
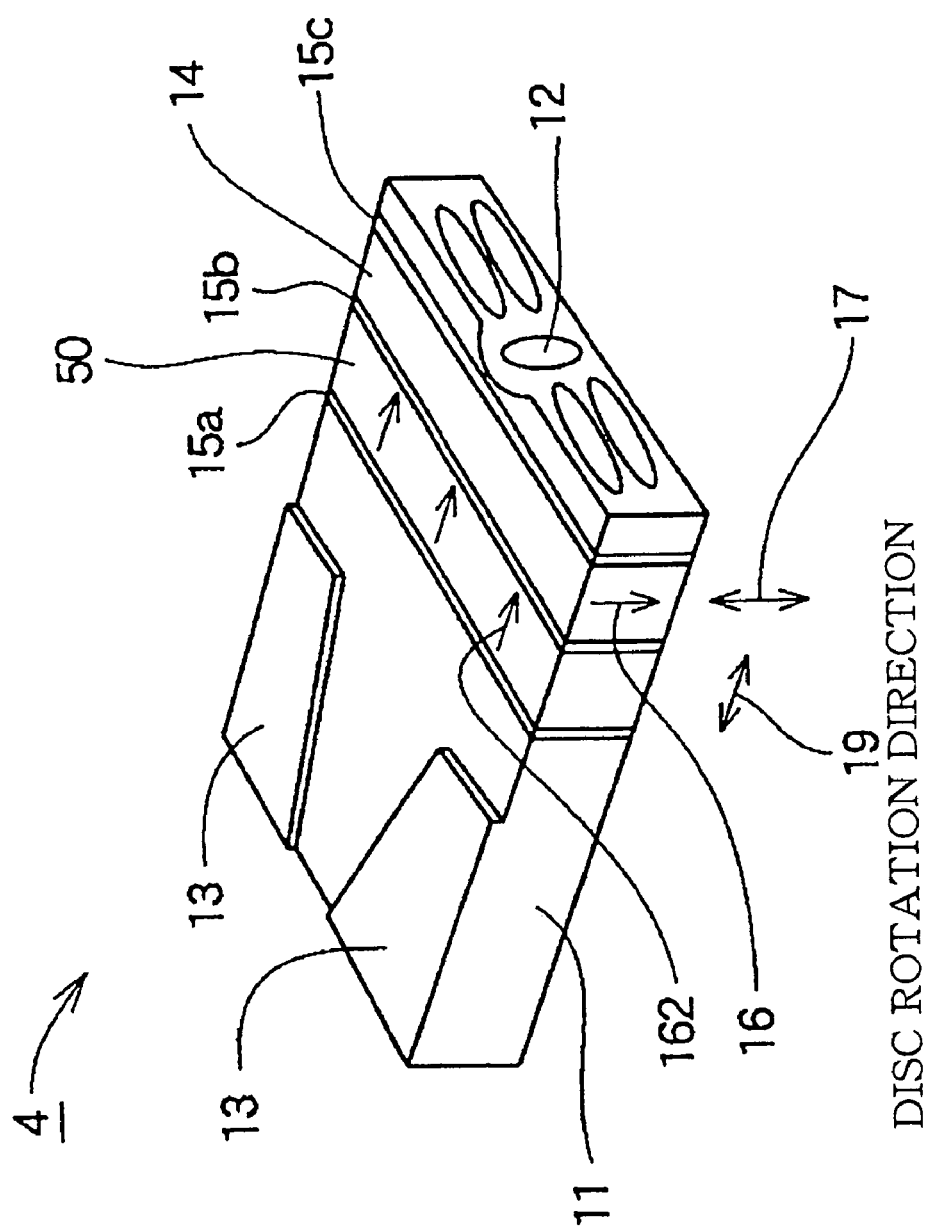
FIG. 5 is a perspective view of a magnetic head (magnetic head slider) according to a fourth embodiment of the present invention.

FIG. 5 is a perspective view of a magnetic head (magnetic head slider) according to a fourth embodiment of the present invention. In the magnetic head (magnetic head slider) 4, at the rear surface (air flow out end) of the slider substrate 111 having a floating plane 13, a first piezoelectric element 50, a second piezoelectric element 14, and a recording/reproducing element 12 are arranged.

The first piezoelectric element 50 has a polarization direction 162 parallel to the direction of the electric field and displaced in the rotary direction (disc rotation direction) 19 of a magnetic disc. The second piezoelectric element 14 has a polarization direction 16 perpendicular to the electric field and displaced in the spacing direction 17.

By using the magnetic head (magnetic head slider) 4 shown in FIG. 5, it is possible to displace the recording/reproduction element 12 in the rotation direction of the magnetic disc and displace the recording/reproduction element 12 in the spacing direction. The electric field applied to the first piezoelectric element 50 is controlled according to a reproduction signal of the recording/reproduction element 12 so as to minimize reproduction output time fluctuation (jitter). The electric field applied to the second piezoelectric element 14 is controlled so as to minimize spacing.

Figure 6:
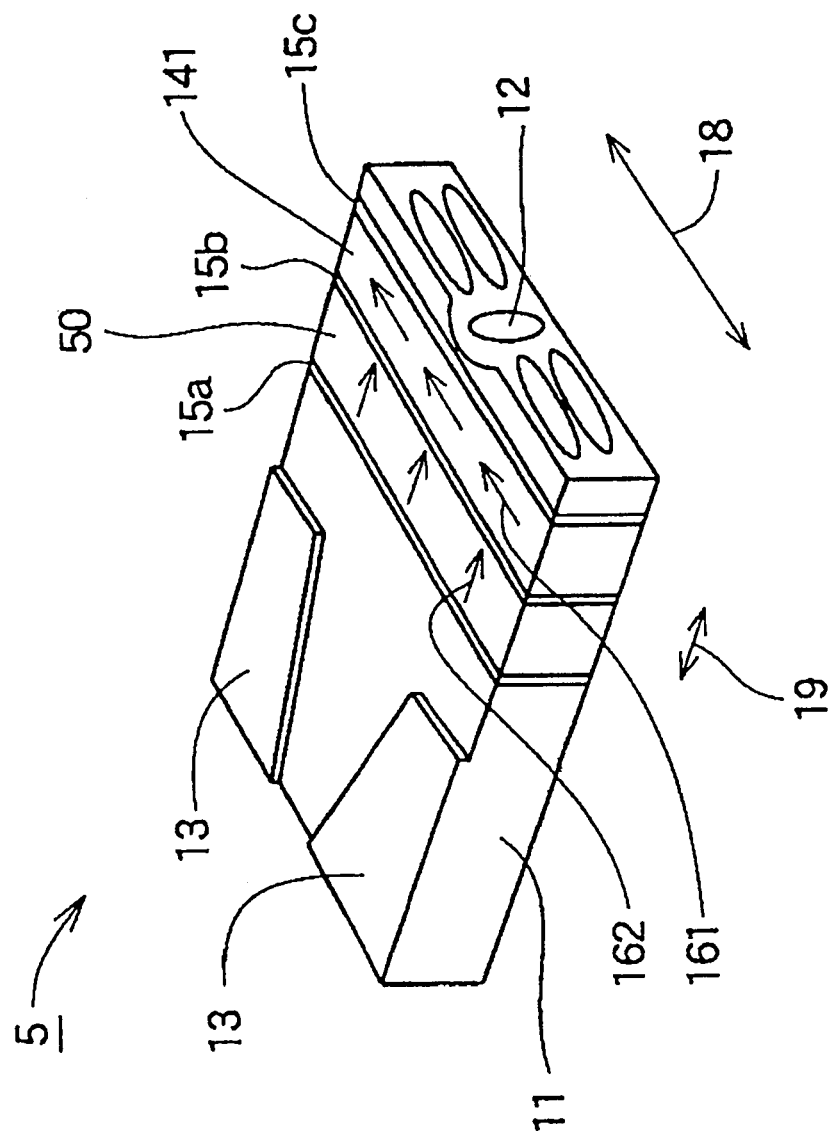
FIG. 6 is a perspective view of a magnetic head (magnetic head slider) according to a fifth embodiment of the present invention.

FIG. 6 is a perspective view of a magnetic head (magnetic head slider) according to a fifth embodiment of the present invention. The magnetic head (magnetic head slider) 5 shown in FIG. 6 includes a first piezoelectric element 50, a second piezoelectric element 141 and a recording/reproduction element 12 arranged at the rear surface (air flow out end) of the slider substrate 11 having a floating plane 13.

The first piezoelectric element 50 has a polarization direction 162 parallel to the direction of the electric field and displaced in the rotary direction (disc rotation direction) 19 of a magnetic disc. The second piezoelectric element 141 has a polarization direction 161 perpendicular to the direction of the electric field and displaced in the track direction 18.

By using the magnetic head (magnetic head slider) 5 of FIG. 6, it is possible to displace the recording/reproduction element 12 in the rotation direction of the magnetic disc and displace the recording/reproduction element 12 in the track direction. The electric field applied to the first piezoelectric element 50 is controlled according to a reproduction signal of the recording/reproduction element 12 so as to minimize reproduction output time fluctuation (jitter). The electric field applied to the second piezoelectric element 141 is controlled so that the recording/reproduction element 12 is matched with the recording track.

Figure 7:
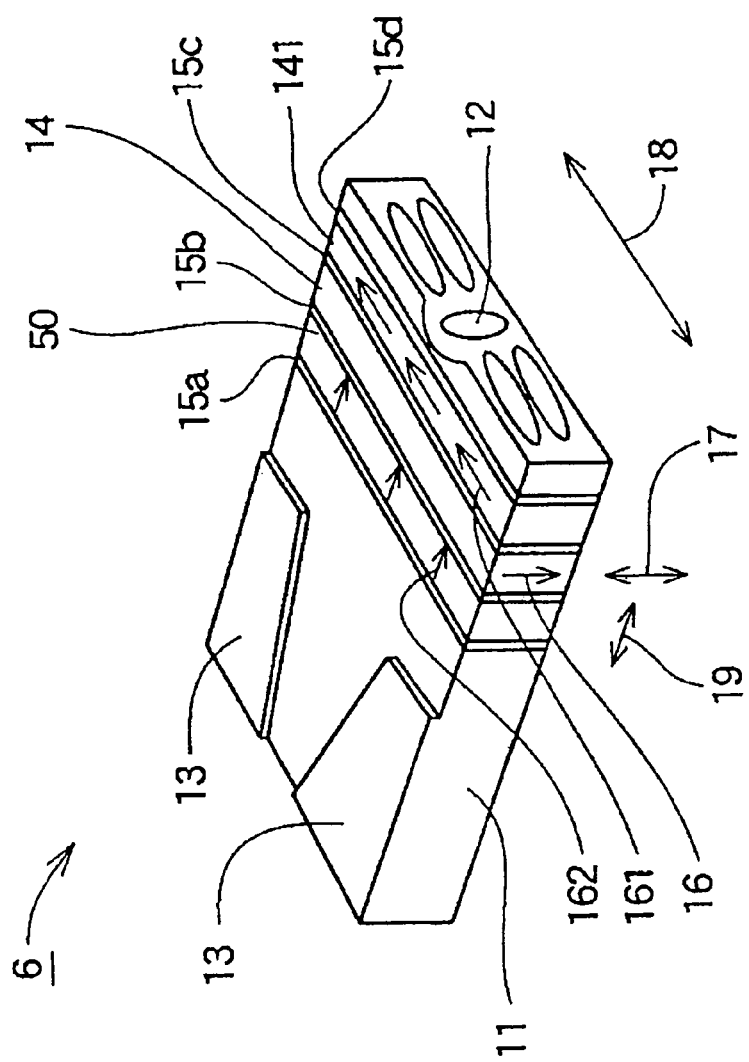
FIG. 7 is a perspective view of a magnetic head (magnetic head slider) according to a sixth embodiment of the present invention.
Figure 9A:
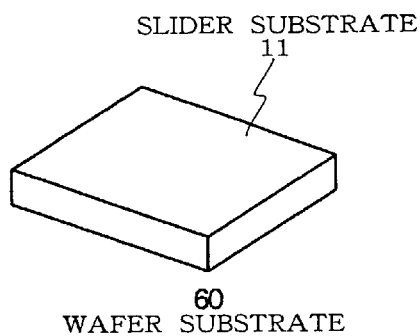
FIG. 9 explains a production procedure of the magnetic head (magnetic head slider) of FIG. 7, wherein the production proceeds from FIG. 9(a) to FIG. 9(f).
Figure 9B:
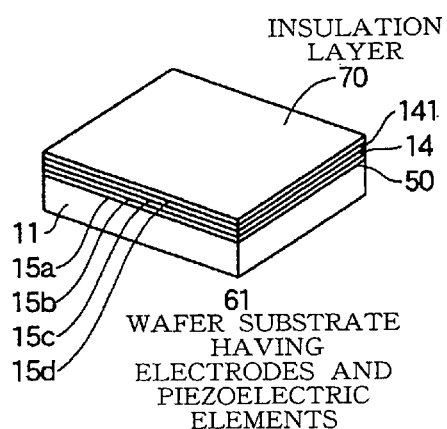
Figure 9C:
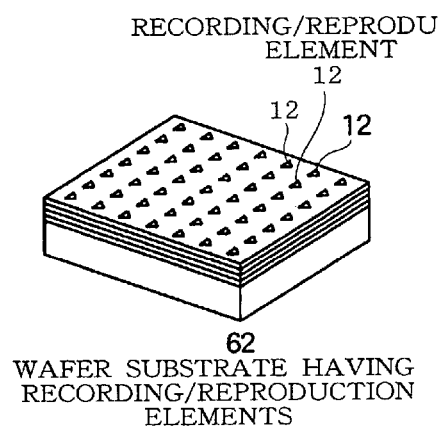
Figure 9D:
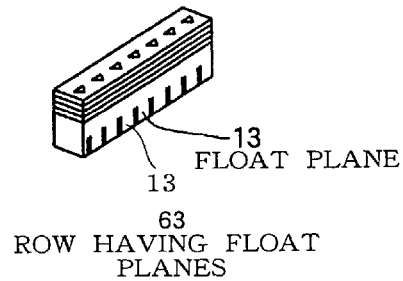
Figure 9E:
Figure 9F:
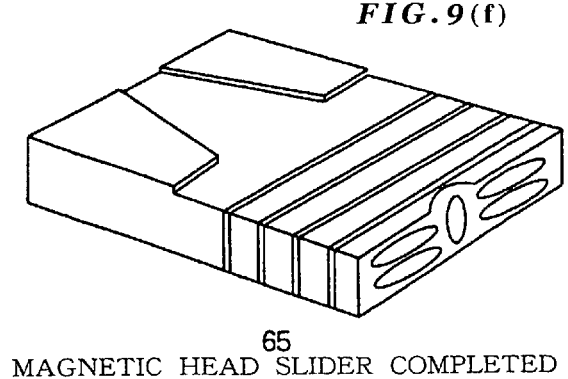

A magnetic head (magnetic head slider) 6 shown in FIG. 7 includes a slider substrate 11 having a floating plane 13 and having at its rear end (air flow out end) a first piezoelectric element 50, a second piezoelectric element 14, and a third piezoelectric element 141, and a recording/reproduction element 12. Reference symbols 15*a* to 15*d* denote electrodes.

The first piezoelectric element 50 has a polarization direction 162 parallel to the direction of the electric field and displaced in a rotation direction of a magnetic disc (disc rotation direction) 19. The second piezoelectric element 14 has a polarization direction 16 perpendicular to the direction of the electric field and displaced in the spacing direction 17. The third piezoelectric element 141 has a polarization direction 161 perpendicular to the direction of the electric field and displaced in the track direction 18. It should be noted that the order of the piezoelectric elements 50, 14, 141 can be changed in any way. For example, the order may be the piezoelectric element 50 displaced in the disc rotation direction 19, the piezoelectric element 141 displaced in the track direction, and the piezoelectric element 14 displaced in the spacing direction.

By using the magnetic head (magnetic head slider) 6 shown in FIG. 7, it is possible to displace the recording/reproduction element 12 in three direction: the disc rotation direction 19, the spacing direction 17, and the track direction 18. The electric field applied to the first piezoelectric element 50 is controlled according to a reproduction signal of the recording/reproduction element 12 so as to minimize reproduction output time fluctuation (jitter). The electric field applied to the second piezoelectric element 14 is controlled so as to minimize spacing. The electric field applied to the third piezoelectric element 141 is controlled so that the recording/reproduction element 12 is matched with the recording track.

By using the magnetic heads (magnetic head sliders) 4, 5, and 6 shown in FIG. 5 to FIG. 7, it was possible to reduce the jitter to ¹/₁₀ when using the magnetic heads (magnetic head sliders) 1, 2, and 3 shown in FIG. 1, FIG. 3, and FIG. 4. It should be noted that the use of the magnetic heads (magnetic head sliders) 4, 5, and 6 shown in FIG. 5 to FIG. 7 did not affect spacing fluctuation or track positioning accuracy.

FIG. 8 shows a relative relationship between the magnetic head (magnetic head slider) of FIG. 7 and a magnetic disc. By using the magnetic head (magnetic head slider) 6 of FIG. 7 to constitute a magnetic disc apparatus, it is possible to displace the position of the recording/reproduction element 12 in three directions of the spacing direction 17, the track direction 18, and the disc rotation direction 19.

FIGS. 9*a–f* shows a production procedure of the magnetic head (magnetic head slider) shown in FIG. 7. FIG. 9(*a*) shows a wafer substrate 60. FIG. 9(*b*) shows a substrate 61 having electrodes and piezoelectric elements. FIG. 9(*c*) shows a substrate 62 having a recording/reproduction element formed. FIG. 9(*d*) shows a substrate cut into a row 63 having a floating plane formed. FIG. 9(*e*) shows a slider chip 64. FIG. 9(*f*) shows an enlarged magnetic head (magnetic head slider) 65 completed with its floating plane upward.

The wafer substrate 60 is formed of sintered alumina-titanium carbide, sintered alumina-titanium, sintered alumina-silicon carbide, sintered alumina-tungsten carbide, cubic boron nitride, sintered silicon—silicon carbide, barium titanate, calcium titanate, zirconia, silicon carbide, silicon, diamond, glassy carbon or ferrite. Each of the piezoelectric elements 50, 14, 141 sandwiched by electrodes (electrode films) 15a to 15d formed by gold, platinum, copper, or the like is bonded by an adhesive to the wafer substrate 60. Thereon, an insulation layer 70 is arranged using alumina, $Si_3N_4$, $SiO_2$, or the like. The surface of the insulation layer 70 is smoothed by polishing. Thus, the substrate 61 having the electrodes and piezoelectric elements is complete.

It should be noted that when the wafer substrate 60 has conductivity, an insulation layer of alumina, $Si_3N_4$, $SiO_2$, or the like is arranged between the wafer substrate 60 and the electrode (electrode film) 15a.

The piezoelectric elements 14 and 141 are made from a thin plate of lead zirconate titanate, barium titanate, or the like and an electric field is applied in the direction of the plate surface for polarization. Moreover, the piezoelectric element 50 is made from the same material and subjected to an electric field in the plate thickness direction for polarization.

After this step, an ordinary thin film head production method can be applied as it is. That is, the recording/reproduction element 12 is formed using lithography on the insulation layer 70 of the substrate 61 having the electrodes and the piezoelectric elements so as to obtain the substrate 62 having the recording/reproduction element.

Next, the substrate 62 having the recording/reproduction elements is cut into rows, and the cut surface is smoothed by polishing. Floating planes 13 are formed by lithography to obtain a row (substrate) 63 having floating planes.

Next, the row 63 having the floating planes is cut into slider chips 64. Thus, a magnetic head (magnetic head slider) 7 is complete.

The magnetic head (magnetic head slider) thus prepared is combined, as shown in FIG. 2, with a support spring 31, a rotary actuator 41, and a magnetic disc 30 to complete the magnetic disc apparatus 40.

As has been described above, for the mechanism for bringing a floating magnetic head slider and a recording/reproduction element toward a magnetic disc and the mechanism for driving the recording/reproduction element in the radial direction of the magnetic disc, the magnetic head according to the invention includes a recording/reproduction element arranged in the vicinity of an air flow out end from the floating magnetic head slider and formed on a piezoelectric element deflecting in a direction perpendicular to the voltage application direction, or includes a recording/reproduction element formed in the vicinity of the air flow out end of the floating magnetic head slider and formed on a piezoelectric element deflecting in a direction parallel to the voltage application direction and a piezoelectric element deflecting in a direction perpendicular to the voltage application direction. This basic configuration enables one to obtain a magnetic disc apparatus capable of fine spacing, track positioning of high accuracy, and suppressing vibration in the rotation direction of the magnetic disc.

In one aspect of magnetic disc apparatus of the present invention, a recording/reproduction element is mounted on a magnetic head slider via a piezoelectric element. Accordingly, by controlling voltage applied to the piezoelectric element so as to control displacement amount of the piezoelectric element, it is possible to displace position of the recording/reproduction element. Since the piezoelectric element is used, it is possible to control the position of the recording/reproduction element with high rigidity, high speed, and high accuracy.

By using a piezoelectric element displaced in the spacing direction by voltage application, it is possible to control spacing between the recording/reproduction element and a magnetic disc. By controlling the displacement amount of the piezoelectric element so as to be in slight contact with the magnetic disc, it is possible to maintain minimum spacing.

By using an electromagnetic element displaced by voltage application in a radial direction (track direction) of a magnetic disc, it is possible to control the position of the recording/reproduction element in the track direction.

By providing a piezoelectric element displaced by voltage application in the spacing direction and a piezoelectric element displaced by voltage application in the track direction, it is possible to displace the recording/reproduction element in two directions. This enables one to control spacing between the recording/reproduction element and the magnetic disc and the track positioning control with high rigidity, high speed, and high accuracy. It is possible to perform spacing control and track positioning control simultaneously without interference between them.

In another aspect of magnetic disc apparatus of the present invention, a recording/reproduction element is mounted via two piezoelectric elements having different displacement directions. Accordingly, it is possible to control position of the recording/reproduction element in two directions. Since the piezoelectric elements are used, it is possible to control position of the recording/reproduction element with high rigidity, high speed, and high accuracy. It is possible to control position in two directions without interference between them. It is possible to control position in two directions simultaneously.

By providing a piezoelectric element displaced in the rotation direction of a magnetic disc and a piezoelectric element displaced in the spacing direction, it is possible to control position of the recording/reproduction element in the disc rotation direction and the spacing direction. The control of position of the recording/reproduction element in the disc rotation direction enables one to reduce jitter of a recording/reproduction signal. The control of position of the recording/reproduction element in the spacing direction enables one to maintain minimum spacing.

By providing a piezoelectric element displaced in the rotation direction of a magnetic disc and a piezoelectric element displaced in the track direction, it is possible to control position of the recording/reproduction element in the disc rotation direction and in the track direction. The control of the recording/reproduction element in the disc rotation direction enables one to reduce jitter of a recording/reproduction signal. The control of the recording/reproduction element in the track direction enables one to perform the track positioning.

In another aspect the magnetic head of the present invention includes a piezoelectric actuator at an air flow out end of a floating type magnetic head slider, the piezoelectric actuator having at both its sides a pair of electrodes, one of which is arranged opposite an air flow out end of the magnetic head slider and the other of which has a recording/reproduction element. Accordingly, it is possible to produce a plurality of magnetic heads by forming a piezoelectric actuator on a slider substrate, forming a plurality of recording/reproduction elements at a predetermined interval, and cutting the slider substrate into pieces.

The magnetic head in another aspect of the invention includes a plurality of layered piezoelectric actuators having different displacement directions and arranged at an air flow out end of a floating type magnetic head slider, wherein a first outer electrode of the layered plurality of actuators is arranged opposite an air flow out end of the magnetic head slider and a second outer electrode of the layered plurality of piezoelectric actuators has a recording/reproduction element. Accordingly, it is possible to produce a plurality of magnetic heads by forming a plurality of layered piezoelectric actuators on a slider substrate, forming a plurality of recording/reproduction elements at a predetermined interval, and cutting the slider substrate into pieces.

The magnetic head production method of one aspect of the invention comprises steps of: forming a piezoelectric element and a plurality of recording/reproduction elements on a slider substrate, cutting the slider substrate into rows, forming a plurality of float planes on the side surfaces of the row substrate, and cutting the row substrate into slider chips. Accordingly, it is possible to economically produce a plurality of magnetic heads.

The magnetic disc apparatus production method of another aspect of the invention produces a magnetic disc apparatus by using the magnetic head produced according to the aforementioned magnetic head production method. Accordingly, it is possible to economically produce a magnetic disc apparatus having high recording density and high mechanical reliability.

The invention may be embodied in other specific forms without departing from the spirit or essential characteristic thereof. The present embodiments are therefore to be considered in all respects as illustrative and not restrictive, and the scope of the invention being indicated by the appended claims rather than by the foregoing description and all changes which come within the meaning and range of equivalency of the claims are therefore intended to be embraced therein.

The entire disclosure of Japanese Patent Application No. 11-156196 (Filed on Jun. $3^{rd}$, 1999) including specification, claims, drawings and summary are incorporated herein by reference in its entirety.

What is claimed is:

1. A magnetic disc apparatus production method comprising steps of:

bonding a piezoelectric element thin plate having on its both sides an electrode film, onto a substrate using one of the electrode films as a bonding surface, forming a first insulation thin film on the other electrode film of the piezoelectric thin plate, forming a plurality of recording/reproduction elements at a predetermined interval on the insulation thin film, forming a second insulation thin film on the recording/reproduction elements, cutting the substrate into row substrates, each having the recording/reproduction elements arranged in a row, polishing that surface of the row substrate having the recording/reproduction elements, forming a plurality of float planes by etching the side surfaces of the row substrate, forming a protection film on the side surfaces of the row substrate, cutting the row substrate into slider chips, bonding the slider chip onto a gimbal spring, wiring the recording/reproduction element and the electrodes of the piezoelectric element in the slider chip to the gimbal spring.

2. The magnetic disk apparatus production method as claimed in claim 1, wherein said substrate is formed of a material selected from the group consisting of sintered alumina-titanium carbide, sintered alumina-titanium, sintered alumina-silicon carbide, sintered alumina-tungsten carbide, cubic boron nitride, sintered silicon—silicon carbide, barium titanate, calcium titanate, zirconia, silicon carbide, silicon, diamond, glassy carbon and ferrite.

3. The magnetic disk apparatus production method as claimed in claim 1, wherein said electrode film is formed of a metal selected from the group consisting of gold, platinum and copper.

4. The magnetic disk apparatus production method as claimed in claim 1, wherein said first and/or second insulation thin film is formed of a material selected from the group consisting of alumina, $Si_3N_4$ and $SiO_2$.

* * * * *